(12) United States Patent
Jezabek et al.

(10) Patent No.: US 10,510,165 B2
(45) Date of Patent: Dec. 17, 2019

(54) SYSTEMS AND METHODS FOR CONTEXT BASED IMAGE COMPRESSION

(71) Applicant: Facebook, Inc., Menlo Park, CA (US)

(72) Inventors: Jan Jezabek, Sunnyvale, CA (US); Barak Reuven Naveh, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/256,393

(22) Filed: Sep. 2, 2016

(65) Prior Publication Data
US 2016/0371858 A1 Dec. 22, 2016

Related U.S. Application Data

(63) Continuation of application No. 14/937,651, filed on Nov. 10, 2015, now Pat. No. 9,466,126, which is a continuation of application No. 14/145,248, filed on Dec. 31, 2013, now Pat. No. 9,224,213.

(51) Int. Cl.
| | |
|---|---|
| *G06T 9/00* | (2006.01) |
| *H04N 19/136* | (2014.01) |
| *G06T 3/40* | (2006.01) |
| *H04N 19/172* | (2014.01) |
| *H04N 19/115* | (2014.01) |
| *H04N 19/162* | (2014.01) |
| *H04N 19/124* | (2014.01) |
| *H04N 19/127* | (2014.01) |
| *H04N 19/167* | (2014.01) |

(52) U.S. Cl.
CPC .............. *G06T 9/00* (2013.01); *G06T 3/4092* (2013.01); *H04N 19/115* (2014.11); *H04N 19/136* (2014.11); *H04N 19/162* (2014.11); *H04N 19/172* (2014.11); *G06T 2200/16* (2013.01); *G06T 2210/32* (2013.01); *G06T 2210/36* (2013.01); *H04N 19/124* (2014.11); *H04N 19/127* (2014.11); *H04N 19/167* (2014.11)

(58) Field of Classification Search
CPC ............. G06T 2200/16; G06T 2210/32; G06T 2210/36; G06T 3/4092; G06T 9/00; H04N 19/136
USPC ......................................................... 382/232
See application file for complete search history.

(56) References Cited

U.S. PATENT DOCUMENTS

| | | | |
|---|---|---|---|
| 6,801,665 B1 | 10/2004 | Atsumi et al. | |
| 6,832,006 B2 * | 12/2004 | Savakis .............. | G06K 9/00234 375/E7.029 |
| 6,950,101 B2 | 9/2005 | Hunt et al. | |

(Continued)

*Primary Examiner* — Iman K Kholdebarin

(74) *Attorney, Agent, or Firm* — Sheppard Mullin Richter & Hampton LLP

(57) ABSTRACT

Techniques for compressing images based on context are provided. A first image and a second image may be identified for display on a client device. One or more contexts of the first image may be identified. One or more contexts of the second image may be identified. A first image quality for the first image may be determined based on the one or more contexts of the first image. A second image quality for the second image may be determined based on the one or more contexts of the second image. The first image may be compressed at the first image quality and the second image at the second image quality. The compressed first image and the compressed second image may be transmitted to the client device.

20 Claims, 6 Drawing Sheets

(56) References Cited

U.S. PATENT DOCUMENTS

| | | | |
|---|---|---|---|
| 7,054,917 B1* | 5/2006 | Kirsch | H04L 67/2847 |
| | | | 707/999.003 |
| 8,015,586 B2 | 9/2011 | Hirai et al. | |
| 8,140,603 B2* | 3/2012 | Getzinger | G06T 9/00 |
| | | | 382/232 |
| 8,270,739 B2 | 9/2012 | Coulombe et al. | |
| 8,275,209 B2* | 9/2012 | Schonberg | G06F 17/147 |
| | | | 382/232 |
| 8,438,476 B2* | 5/2013 | Uhlig | G06F 17/212 |
| | | | 715/251 |
| 8,648,858 B1* | 2/2014 | Swenson | G06T 9/00 |
| | | | 345/428 |
| 8,811,762 B2 | 8/2014 | Sasai et al. | |
| 10,031,891 B2* | 7/2018 | Kumar | G06F 17/30902 |
| 2008/0037880 A1* | 2/2008 | Lai | H04N 19/172 |
| | | | 382/232 |
| 2008/0120546 A1* | 5/2008 | Pulier | G11B 27/034 |
| | | | 715/716 |
| 2010/0305441 A1 | 12/2010 | Lin et al. | |
| 2011/0026591 A1* | 2/2011 | Bauza | G06T 1/00 |
| | | | 375/240.12 |
| 2012/0174037 A1* | 7/2012 | Relyea | G06F 3/0481 |
| | | | 715/848 |
| 2012/0311623 A1* | 12/2012 | Davis | H04N 5/765 |
| | | | 725/18 |

\* cited by examiner

SYSTEMS AND METHODS FOR CONTEXT BASED IMAGE COMPRESSION

CROSS-REFERENCE TO RELATED APPLICATIONS

This application is a continuation of U.S. patent application Ser. No. 14/937,651, filed on Nov. 10, 2015 and entitled "Systems and Methods for Context Based Image Compression", which is a continuation of Ser. No. 14/145,248, filed on Dec. 31, 2013, now issued as U.S. Pat. No. 9,224,213, and entitled "Systems and Methods for Context Based Image Compression", which is incorporated herein by reference.

FIELD OF THE INVENTION

The present disclosure relates to the field of image compression and, more particularly, context based image compression.

BACKGROUND

A social networking system may support a website or application (e.g., mobile application) to enable its users, such as persons or organizations, to interact with each other. With input from a user, the social networking system may create and store a user profile associated with the user. The user profile may include demographic information, communication-channel information, information about personal interests, as well as other types of information about a user. The social networking system may also create and store a record of relationships of the user with other users of the social networking system, as well as provide services (e.g., wall posts, news feed, photo-sharing, event organization, messaging, games, advertisements) to facilitate social interaction among users.

Various content may be provided on pages of the website or application. For example, social networking pages may include, a "news feed" section (or page) for user posts or activities, a "games" section for user playable games, "photos" or "videos" section for user images or videos, a "timeline" section related to historical user activities, or any other type of section that may be implemented within the social networking pages. In many instances, the social networking pages may include images that are available for a user to view or interact with.

SUMMARY

To compress images based on context, computer implemented methods, systems, and computer readable media, in an embodiment, may identify a first image and a second image for display on a client device. One or more contexts of the first image may be identified. One or more contexts of the second image may be identified. A first image quality for the first image may be determined based on the one or more contexts of the first image. A second image quality for the second image may be determined based on the one or more contexts of the second image. The first image may be compressed at the first image quality and the second image at the second image quality. The compressed first image and the compressed second image may be transmitted to the client device.

In an embodiment, the identifying the one or more contexts of the second image may include predicting a likelihood of a user to interact with the second image.

In an embodiment, the predicting the likelihood of the user to interact with second image may include predicting a likelihood of the user to interact with content including the second image.

In an embodiment, the content including the second image may be a news item in a news feed.

In an embodiment, the identifying one or more contexts of the second image may include predicting a likelihood of the user to interact with the second image. The predicted likelihood of the user to interact with the second image may be higher than a predicted likelihood of the user to interact with the first image. The second image quality may be a higher image quality than the first image quality.

In an embodiment, the identifying one or more contexts of the second image may include receiving an indication of an intent of a user to interact with the second image. The second image quality may be determined based on the indication of the intent of the user to interact with the second image.

In an embodiment, the first image may be a preview image of the second image. The second image quality may be a higher image quality than the first image quality. The indication of the intent may include user selection of the first image.

In an embodiment, the identifying one or more contexts of the second image may include identifying a size of the second image. The second image quality may be determined based on the size of the second image.

In an embodiment, the identifying one or more contexts of the second image may include identifying a position of the second image in a layout of the client application. The second image quality may be determined based on the position of the second image in the layout of the client application.

In an embodiment, the identifying one or more contexts of the second image may include identifying a number of images on a page with the second image. The second image quality may be determined based on the number of images on the page with the second image.

In an embodiment, the identifying one or more contexts of the second image may include identifying a revenue generating status of the second image. The second image quality may be determined based on the revenue generating status of the second image.

In an embodiment, an image quality metric may be computed for the second image based on the identifying one or more contexts of the second image. The second image quality may be determined based on the image quality metric.

In an embodiment, a size parameter of the second image may be received from the client device.

In an embodiment, a position parameter of the second image may be received from the client device.

In an embodiment, the first image and the second image may be obtained from an image data store.

In an embodiment, the method may be executed by a social networking system.

In an embodiment, the client device may be a mobile phone.

In an embodiment, the client application may be a website accessible by a web browser on the client device.

Many other features and embodiments of the invention will be apparent from the accompanying drawings and from the following detailed description.

Figure 1:
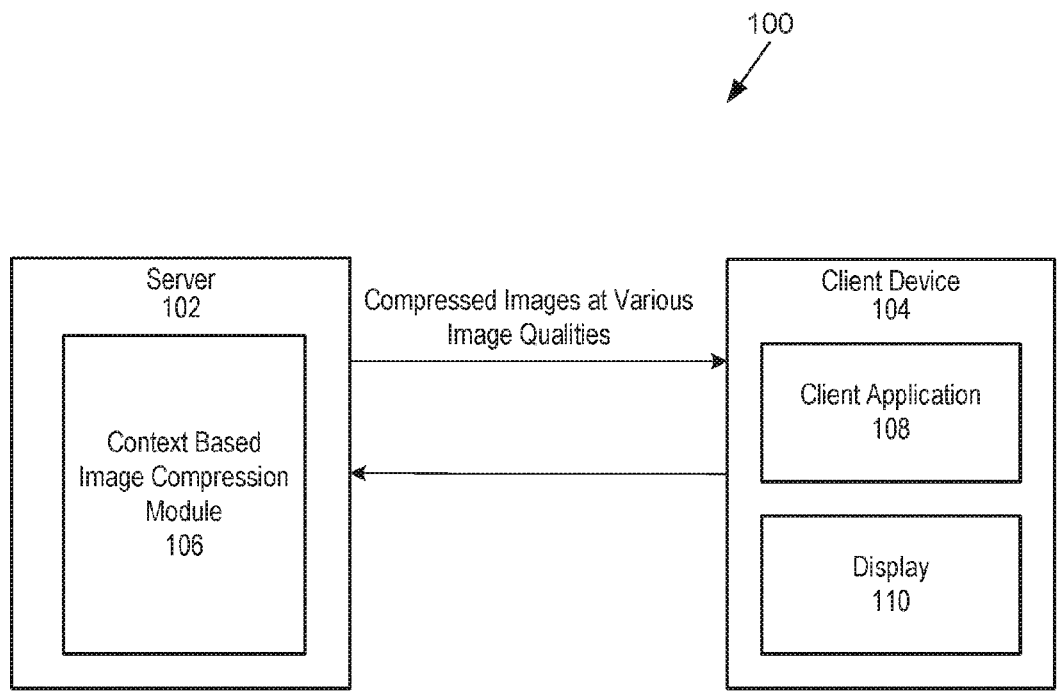
FIG. 1 illustrates an example system for context based image compression, according to an embodiment.

The figures depict various embodiments of the present invention for purposes of illustration only, wherein the figures use like reference numerals to identify like elements. One skilled in the art will readily recognize from the following discussion that alternative embodiments of the structures and methods illustrated in the figures may be employed without departing from the principles of the invention described herein.

DETAILED DESCRIPTION

Context Based Image Compression

Social networking systems may include a client application that enables a user to interface with the social networking system. The term "client application" is used broadly herein and may include any program or software that provides a user interface to be presented (or displayed) on a client device for a user. The client application may include a standalone application executed from the client device, such as a mobile application executed from a mobile phone. The client application may also include a website having one or more web pages accessible by the user through a web browser on the client device. The client application may provide images for display to a user on a client device. The images described herein may relate to pictures, photographs, graphical images, advertisements, etc. In certain instances, the images described herein may also be equally applicable to a set of images, such as video. It should be appreciated that while features of the systems and methods in the present disclosure may be described with respect to a social networking system, the features may also be applicable to any other suitable networked computer systems involving display of various images.

In certain circumstances, the bandwidth associated with a client device may be limited or otherwise constrained. Such bandwidth constraints may impact the performance of the client device. For example, low performance mobile phones may not have the processing power to resize images (e.g., shrink) for display on the mobile phone. In addition, these mobile phones may not have the processing power to download large amounts of data associated with high quality images or multiple images within an acceptable amount of time. Longer download times may also adversely impact the speed and operation of the client application in general on the client device, resulting in unsatisfactory user experience. The bandwidth may also be constrained based on data limits or costs to download data to a client device. For example, users may be charged by service providers based on the amount of data that is downloaded to their client devices.

The amount of data (or weight) that is required to transmit an image to a client device may depend on various factors, such as the image quality at which the image is to be compressed, the size of the image, etc. Compression at higher image qualities may require more data to adequately represent the image than compression at lower image qualities. Furthermore, compression of larger sizes of an image may require more data than compression of smaller sizes. Image quality may be informed by various factors including but not limited to sharpness, noise, dynamic range, tone reproduction, contrast, color accuracy, distortion, vignetting, exposure accuracy, lateral chromatic aberration, lens flare, color moire, and artifacts.

Conventional image compression techniques may enable indiscriminant adjustment of image quality globally for all images associated with the entire client application without consideration of each image on an individual basis. However, such a "single knob" adjustment to the entire client application may not optimally reduce the amounts of data transmitted to the client device.

Systems and methods described herein provide for image compression at various image qualities based on one or more contexts associated with each image required by a client application. The one or more contexts of each image may be identified and used to determine an image quality for compressing the image at the required size for the client application. Some contexts may suggest a need for a high image quality to be used, such as images determined to be of interest to the user. Other contexts may suggest that a high image quality may not be necessary and that a lower image quality may be adequate. By compressing the image at the lower image quality, less data may be required to represent the image. After compression, the compressed images may then be transmitted to the client device.

FIG. 1 illustrates an example system for context based image compression, according to an embodiment. The components shown in this figure and all figures herein are exemplary only, and other implementations may include additional, fewer, or different components. Some components may not be shown so as not to obscure relevant details.

A system 100 includes a server 102 and a client device 104. The term "server" is used broadly herein and may include a computer system, such as one or more servers, that provides content to the client device 104. The server 102 may include a context based image compression module 106. The client device 104 may include any computer system. In various embodiments, the client device 104 may include a desktop computer, a laptop computer, a tablet computing device, a mobile phone, or any other device. The client device 104 may include a client application and a display 110. The server 102 may be remote from the client device 104. The server 102 may be communicatively coupled to the client device 104 through a wired or wireless connection. The server 102 and client device 104 may be communicatively coupled through one or more networks, such as the Internet.

The client application 108 may be run on the client device 104 and displayed on display 110 to a user of the client application. The client application 108 may be a standalone application, such as a mobile application for instance. In other embodiments, the client application 108 may be run on the server 102 and communicated to the client device 104 for presentation on the client device 104. For example, the client application 108 may include a website having one or more web pages accessible by the user through a web browser.

The context based image compression module 106 may provide the client device 104 with the images required by the client application 108. The images required by the client application 108 may be stored in an "original" format (e.g., size, image quality) and accessible by the context based image compression module 106. These images stored in the original format may also be referred to herein as "original images". The context based image compression module 106 may compress the original images at various image qualities based on one or more contexts of the images. The original images may be compressed for the appropriate size required by the client application 108.

The client device 104 may communicate information to the server 102. For example, the client device 104 may request the images required by the client application 108 and indicate various parameters of the images. The parameters may relate to, for example, the size of the image or the position of the image in the layout of the client application 108. In an embodiment, the client device 104 may communicate event data or navigation data relating to user action in the client application 108. For example, event data may relate to user inputs applied to the client device 104, how much time the user spends on various pages or tabs within a page, what content the user is accessing, etc. The navigation data may relate to where the user navigates in the client application, such as which pages the user visits, which tabs the user visits, etc. The event data and navigation data may be used to provide context for one or more images in certain circumstances.

Figure 2:
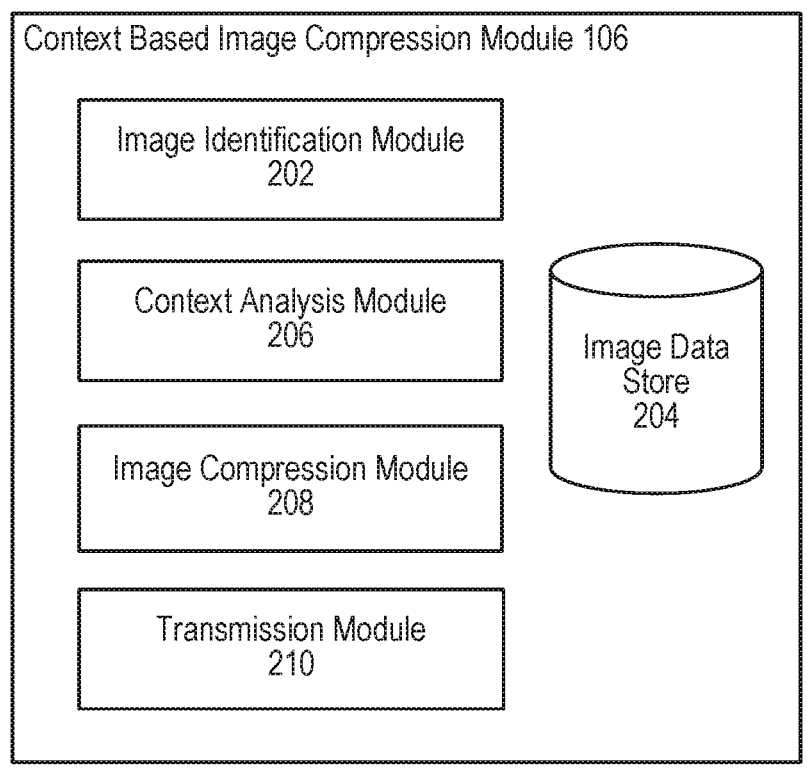
FIG. 2 illustrates an example of an context based image compression module, according to an embodiment.

FIG. 2 illustrates an example of the context based image compression module 106, according to an embodiment. The context based image compression module 106 may include an image identification module 202, an image data store 204, a context analysis module 206, an image compression module 208, and a transmission module 210.

The image identification module 202 may identify images required by the client application 108 for display on the client device 104. The image identification module 202 may analyze pages of the client application 108 and identify layouts of the pages as well as the images on the pages. The image identification module 202 may also identify parameters associated with the images, such as a size parameter, position parameter, image count parameter etc. The size parameter may indicate a dimension of an image, such as the length and width of the image. The length and width may be measured in pixels. The position parameter may indicate a position of the image in the layout of the page. The image count parameter may indicate a number of images on the page or in a section of the page.

At times, the client application 108 may require two different sized images of the same content (e.g., the same picture). Although the same original image may be used to generate the two different sized images for the client application 108, the two different sized images may be identified as separate images for independent compression based on the individual context of each image. For example, a thumbnail sized image associated with certain content may be identified as a separate image from a regular sized image of the same content.

In an embodiment, the layout of the page or the various parameters associated with the images on the page may be provided by the client device 104 to the image identification module 202 on the server 102. For example, the client application 108 may run on the client device 104 and may request the images from the server 102. In another embodiment, the image identification module 202 may not receive the layout of the page or the various parameters associated with the images from the client device 104. For example, the client application 108 may run on the server 102. The image identification module 202 may analyze the pages of the client application 108 to determine the layout of the page or the various parameters associated with the images on the page.

The image data store 204 may contain the original images that are to be compressed at various image qualities for presentation on the client device 104. The original images may not be the same size as required by the client application 108. An original image may be stored in the image data store 204 at a single image quality, such as a high image quality. The image data store 204 may include a database or other data storage device. The image data store 204 may include various types of persistent memory, such as Flash or other types of memory.

The location of the image data store 204 may vary in different embodiments. In an embodiment, the image data store 204 may be located within the context based image compression module 106 or within the server 102 including the context based image compression module 106. In another embodiment, the image data store 204 may be located remote from the context based image compression module 106 or the server 102 including the context based image compression module 106.

The context analysis module 206 may determine the context of the images that were identified by the image identification module 202. The context of an image may be used as a factor in determining an image quality when compressing the image. Some contexts may suggest a need for a high image quality to be used. Other contexts may suggest that a high image quality may not be necessary and a lower image quality may be adequate. In an embodiment, more than one context may be used as a factor to determine the image quality of the image. In an embodiment, an image quality metric for an image may be computed based on the one or more contexts of an image. The image quality metric may be used to determine the image quality at which the image will be compressed. The potential values for the image quality metric may be associated with various levels of image qualities.

The image compression module 208 may obtain the original image from the image data store 204 and compress the original image based on the context of the identified image and the required size of the image, as indicated by the size parameter for instance. Various compression techniques may be used in different embodiments, such as transform coding (e.g., Discrete Cosine Transform, wavelet transform, or other Fourier-related transform), chroma subsampling, or fractal compression. The compression may be lossless. In certain embodiments, the compression may be lossy and result in a degraded image. For example, the compression may result in some degree of distortion, some inclusion of artifacts, or some loss of fidelity in the image. The image quality may be a characteristic of the compressed image and may reflect a measurement of the image degradation.

The transmission module 210 may transmit the compressed images to the client device 104 for presentation on the display 110 of the client device 104. The transmission module 210 may include, for example, a wired or wireless transceiver. The compressed images may be transmitted using any variety of transmission protocols.

Figure 3:
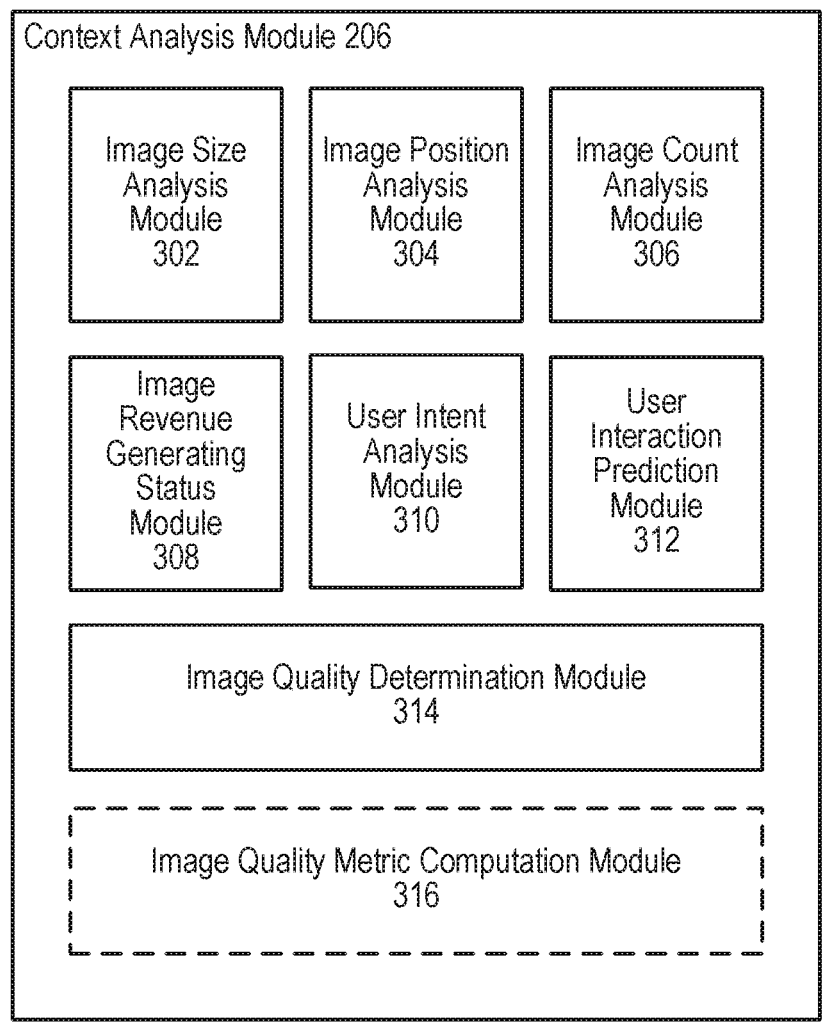
FIG. 3 illustrates an context analysis module, according to an embodiment.

FIG. 3 illustrates the context analysis module 206, according to an embodiment. The context analysis module 206 may include various modules to identify different contexts of images. For example, the context analysis module 206 may include an image size analysis module 302, an image position analysis module 304, an image count analysis module 306, an image revenue generating status module 308, a user intent analysis module 310, and a user interaction prediction module 312. The context analysis module 206 may also include an image quality determination module 314 that may determine an image quality for compression based on the identified contexts. In an embodiment, two levels of image quality may be implemented, such as a high image quality and a low image quality. In other embodiments, more than two levels of image quality may be implemented. For example, various percentages may be implemented for image qualities in different embodiments. For example, a high image quality may be associated with 5% image degradation (e.g., 95% image quality), a medium image quality may be associated with 15% image degradation (e.g., 85% image quality, and a low image quality may be associated with a 25% image degradation (e.g., 75% image quality). These values are exemplary and other values may be used in other embodiments.

The image size analysis module 302 may identify contexts that relate to a size of the image. Based on the specific context identified, the image quality determination module 314 may then determine the image quality that the image should be compressed at. In an embodiment, the size of the image may be provided by the size parameter identified by the image identification module 202.

In an embodiment, the image size analysis module 302 may identify particular images smaller than a predetermined threshold size, such user profile pictures. The image quality determination module 314 may determine that these images may be compressed at a higher image quality to reduce image degradation, since image degradation in smaller images may have a more detrimental impact on the recognition of the image, in some instances. For example, the user profile picture may be compressed at a higher image quality to ensure that the user remains recognizable and faithfully depicted.

In an embodiment, the image size analysis module 302 may identify smaller images that are used as preview images to present to the user. The user may select (e.g., click on) a preview image to view a larger sized version of the image. The image quality determination module 314 may determine that the preview images may be compressed at a lower image quality since the content of the preview images only needs to be sufficiently recognizable for the user to determine if she wishes to see a larger sized version of the image. Based on compression at a lower image quality, the amount of data required to be transmitted to the client device 104 may be reduced.

The image position analysis module 304 may identify contexts that relate to a position of the image in a layout of the client application 108. Based on the specific context identified, the image quality determination module 314 may then determine what image quality the image should be compressed at. The position of the image may be provided by the position parameter identified by the image identification module 202.

The image position analysis module 304 may identify images that are in specific sections (or areas) of the layout of a page. For example, the image position analysis module 304 may identify images that are positioned within a news feed section of a page as preview images. The news feed section may include, for example, a list of news items that are displayed to the user. The news items may include a short summary or synopsis of the content and may include one or more associated images, for example. Example news items may include, but are not limited to, news articles, user status updates, updates to users' photo albums, advertisements, etc. The image quality determination module 314 may determine that these associated images are preview images which may be compressed at a lower image quality. Based on compression at the lower image quality, the amount of data required to be transmitted to the client device 104 may be reduced.

As another example, the image position analysis module 304 may identify images that are positioned within photo albums. The image quality determination module 314 may determine that the images within photo albums may be compressed at a higher image quality since the user is likely to want to view them in a higher image quality if he is perusing the photo album.

As yet another example, the image position analysis module 304 may identify images that are on interstitial pages of the client application 108. The interstitial pages may include pages that are provided between an origination page and a destination page. For example, a user may be presented with an interstitial page, such as an advertisement or login page, before arriving at a desired destination page. The image quality determination module 314 may determine that the images on the interstitial pages may be compressed at a lower image quality since they are likely to be less important to the user. Based on compression at the lower image quality, the amount of data required to be transmitted to the client device 104 may be reduced.

The image count analysis module 306 may identify contexts that relate to a number of images on a page, or in a section of a page, along with the image. Based on the specific context identified, the image quality determination module 314 may then determine what image quality the image should be compressed at. The number of the images may be provided by the image count parameter identified by the image identification module 202.

The image count analysis module 306 may identify whether a number of images on a page, or in a section of a page, exceed a predetermined threshold. When the number of images exceeds a threshold, it may be determined that the user may be more likely to be scanning the images and only need to recognize the images to sufficient degree. In an embodiment, the image quality determination module 314 may determine that all of the images may be compressed at a lower image quality to reduce the amount of data required to be transmitted to the client device 104. In another embodiment, one or more of the images may be determined to be exceptions (e.g., due to one or more other contexts) and may be compressed at a higher image quality.

The image revenue generating status module 308 may identify contexts that relate to a revenue generating status for the image. Based on the specific context identified, the image quality determination module 314 may then determine what image quality the image should be compressed at. For example, an image may be associated with an advertisement that generates a significant amount of revenue, and may thus be compressed at a higher image quality. As another example, the image may be associated with an advertisement that the advertiser has paid a high premium for, and thus the image may be compressed at a higher image quality. Other images that are associated with advertisements that do have any elevated revenue generating status may be compressed at lower image qualities to reduce the amount of data to be transmitted to the client device 104.

The user intent analysis module 310 may identify contexts that relate to a user's intent related to an image, such as a user's intent to view an image. Based on the specific context identified, the image quality determination module 314 may then determine what image quality the image should be compressed at. For example, when the user selects (e.g., clicks on) a preview image to view a larger sized version of the image, there is an intent by the user to want to view the larger sized version of the image. Therefore, the image quality determination module 314 may determine that the larger sized version of the image may be compressed at a higher image quality. Similarly, if a user selects to view images within a photo album, then it may be determined that there is an intent that the user wants to view the images in the photo albums. Therefore, the image quality determination module 314 may determine that the images in the photo album may be compressed at a higher image quality. Similarly, if a user selects content (e.g., a news item in a news feed) including an image, then it may be determined that there is an intent that the user wants to view the image in the content. The image quality determination module 314 may determine that the image in the content may be compressed at a higher image quality.

The user interaction prediction module 312 may identify contexts of an image that relate to a predicted likelihood of a user to interact with (e.g., view) the image. Based on the specific context identified, the image quality determination module 314 may then determine what image quality the image should be compressed at. For example, the image quality determination module 314 may determine that the image may be compressed at a higher image quality based on predictions of a higher likelihood that the user may interact with the image.

Various prediction algorithms may be implemented in different embodiments to predict the likelihood of a user to interact with an image. In an embodiment, the prediction algorithms may be based on information specific to the user of the client application 108. For example, social networking systems may have access to a significant amount of data about the user that may allow accurate predictions to be made. Social networking systems may gather a rich set of information about the users, such as their preferences (e.g., items they have "liked", purchased, or viewed), interests (e.g., associations they have joined), actions or behaviors (e.g., news items they have commented on, pages they have visited, the time they spent on various pages), etc. The social networking system may also make inferences from the preferences, interests, actions or behaviors, etc., of the user's friends.

In an embodiment, the predicted likelihood of a user to interact with an image may be based on the predicted likelihood of the user to interact with content including the image. For example, a prediction algorithm may be implemented to predict the likelihood of a user to interact with various content (e.g., news items in a news feed) in the client application 108. Some of these news items may include one or more images. The predicted likelihood of the user to interact with an image may be based on the predicted likelihood of interaction with the content associated with the image. In an embodiment, content (e.g., news items in a news feed) may be ranked based on the predicted likelihood of user interaction with the content. For example, the news items in a news feed may be sorted such that news items ranked highest are positioned to the top of the news feed. In this way, the higher ranked news items will be presented to the user first. In an embodiment, the predicted likelihood of the user to interact with an image may be based on the ranking of the content associated with the image. For example, the image quality determination module 314 may determine that the images included in the top five news items in a news feed may be compressed at a higher image quality, and the remaining news items in the news feed may be compressed at a lower image quality.

In an embodiment, the predicted likelihood of a user to interact with an image on page of the client application 108 may be based on a predicted click through rate of the image or the content including the image. For example, if many users tend to click through an image or content including an image, then the image may be compressed at a higher quality based on a predicted likelihood that the user may click through the image or content including the image. If a user's friends are shown to have a high likelihood of clicking through an image or content including the image, then the predicted likelihood of the user to click through the image or content may also be determined to be high.

In an embodiment, the predicted likelihood of a user to interact with an image may be higher if the image, or content including the image, may be associated as important or highly relevant to the user. The images may then be compressed at a higher quality. For example, content (e.g., stories, status updates, news items) related to major life events (e.g., marriages) of the user's friends may be determined to be important to the user. An image, or content including the image, that is similar to the type of images or content that the user has previously shown an interest in may be determined to be important to the user. For example, a user may have an interest in motorcycles and thus any images of motorcycles may be compressed at a higher image quality. Images from a user's close friends or family may be determined to be important to the user and thus compressed at a higher image quality.

In an embodiment, the image quality determination module 314 may determine whether an image has already been downloaded into a cache memory or other type of data store of the client device 104. For example, if an image has previously been compressed at a higher image quality and stored within cache memory of the client device 104, then the image quality determination module 314 may elect to use the higher image quality image stored in cache memory even if it has been determined that a lower image quality is adequate. Since the higher image quality image is already stored in cache memory, transmission to the client device 104 is not necessary and no additional data is required to be transmitted to the client device 104. Similarly, if an image of low image quality is already within the cache memory of the client device 104, then the cached image of lower image quality may be used instead of compressing and transmitting another image of lower image quality.

In certain embodiments, the context analysis module 206 may include an image quality metric computation module 316 that may compute an image quality metric based on one or more contexts identified by the image size analysis module 302, the image position analysis module 304, the image count analysis module 306, the image revenue generating status module 308, the user intent analysis module 310, and the user interaction prediction module 312. The image quality determination module 314 may then determine an image quality for an image based on the computed image quality metric for the image.

In an embodiment, the image quality metric may be binary and associated with two levels of image quality, such as a high image quality or a low image quality. In other embodiments, the image quality metric may include more than two levels and associated with various levels of image quality. For example, each of the contexts applicable to an image may have an associated score (or points) that may be added, or otherwise combined based on a formula or algorithm, to generate the image quality metric. For instance, contexts associated with higher image qualities may provide positive point values and contexts associated with lower image qualities may provide negative point values. In an embodiment, the image quality metric may provide various weights to different contexts. In this way, some contexts may have higher importance or a higher priority than other contexts. In some instances, one context may override or nullify other contexts. It should be appreciated that various rules may be implemented to prioritize and weight various contexts accordingly.

Figure 4:
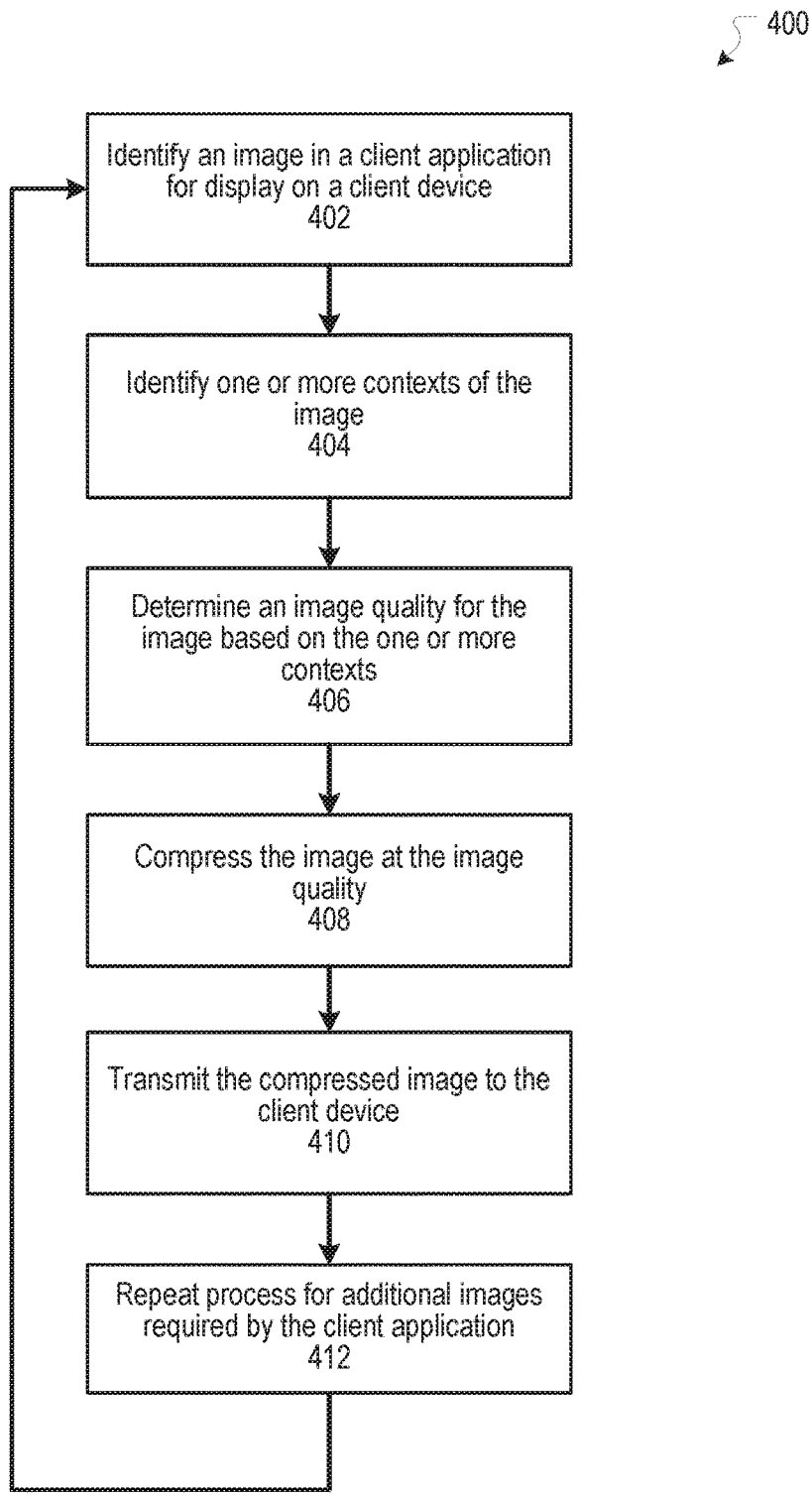
FIG. 4 illustrates an example method for context based image compression, according to an embodiment.

FIG. 4 illustrates an example method for context based image compression, according to an embodiment. It should be appreciated that the discussion above for FIGS. 1-3 may also apply to the process for FIG. 4. For the sake of brevity and clarity, every feature and function applicable to FIG. 4 is not repeated here.

At block 402 of method 400, an image in a client application for display on a client device may be identified. The image may be for display on a client device, such as a mobile phone for instance. Pages of the client application may be analyzed to identify layouts of the pages as well as the images on the pages. Parameters associated with the image may also be identified, such as a size parameter, position parameter, image count parameter etc. In an embodiment, the client application may run on the client device and the image, or various parameters associated with the image, may be provided by the client device. In another embodiment, the client application may run on the server and the image, or various parameters associated with the image, may be provided by analysis of the pages of the client application. In an embodiment, block 402 may be performed by the image identification module 202 of FIG. 2.

At block 404, one or more contexts of the image may be identified. The one or more contexts may relate to, for example, a size of the image, a position of the image in the client application, the number of images presented on a page of the client application, the image revenue generating status of the image, the user intent related to the image, or the predicted likelihood of the user to interact with the image or content including the image. In an embodiment, an image quality metric for an image may be computed based on the one or more contexts of the image. The image quality metric may be used to determine the image quality for compression. In an embodiment, block 404 may be performed by the context analysis module 206 of FIG. 2.

At block 406, an image quality for the image may be determined based on the one or more contexts identified at block 404. In an embodiment, two levels of image quality may be implemented, such as a high image quality and a low image quality. In other embodiments, more than two levels of image quality may be implemented. In an embodiment, the image quality may be determined based on the image quality metric that may be computed at block 404. In an embodiment, block 406 may be performed by the context analysis module 206 of FIG. 2.

At block 408, the image may be compressed at the image quality determined at block 406. For example, the image may be stored as an original image in an image data store. The original image may not be the size required by the client application or the desired image quality as determined at block 406. The original image may then be compressed at the image quality determined at block 406 for the size required by the client application. In an embodiment, block 406 may be performed by the image compression module 206 of FIG. 2.

At block 410, the compressed image may be transmitted to the client device. The compressed image may be transmitted by a transceiver, for example. The compressed image may be received by the client device and displayed on the client device to the user. In an embodiment, block 410 may be performed by the transmission module 210 of FIG. 2.

At block 412, the process may be repeated for any additional images required by the client application for display on the client device. Blocks 402 through 410 may be repeated for the subsequent images. It should be appreciated that in other embodiments, the process for different images may be performed simultaneously or sequentially.

Social Networking System—Example Implementation

Figure 5:
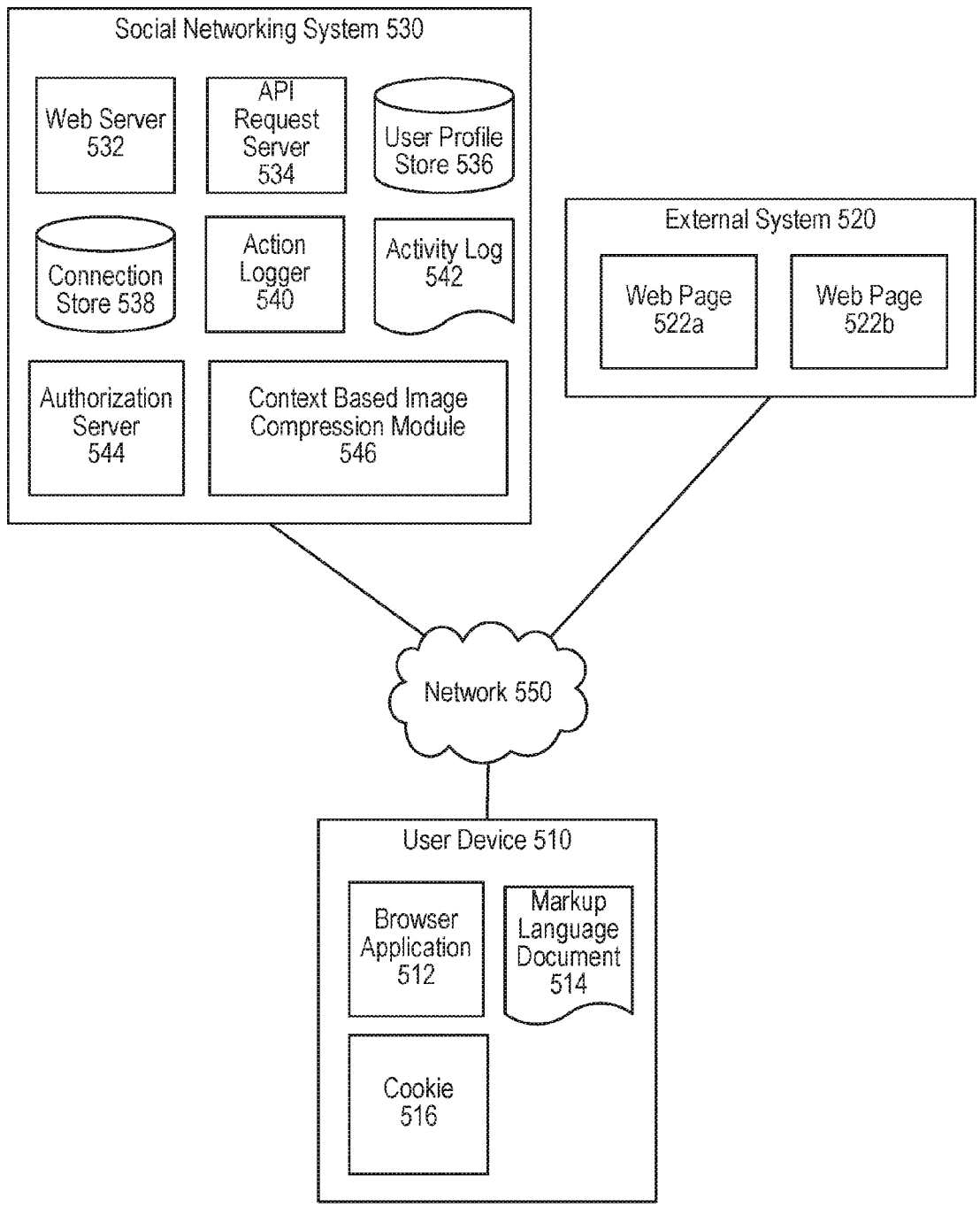
FIG. 5 illustrates a network diagram of a system for context based image compression within a social networking system, according to an embodiment.

FIG. 5 is a network diagram of an example system 500 for context based image compression, in accordance with an embodiment of the invention. The system 500 includes one or more user devices 510, one or more external systems 520, a social networking system 530, and a network 550. In an embodiment, the social networking system discussed in connection with the embodiments described above may be implemented as the social networking system 530. For purposes of illustration, the embodiment of the system 500, shown by FIG. 5, includes a single external system 520 and a single user device 510. However, in other embodiments, the system 500 may include more user devices 510 and/or more external systems 520. In certain embodiments, the social networking system 530 is operated by a social network provider, whereas the external systems 520 are separate from the social networking system 530 in that they may be operated by different entities. In various embodiments, however, the social networking system 530 and the external systems 520 operate in conjunction to provide social networking services to users (or members) of the social networking system 530. In this sense, the social networking system 530 provides a platform or backbone, which other systems, such as external systems 520, may use to provide social networking services and functionalities to users across the Internet.

The user device 510 comprises one or more computing devices that can receive input from a user and transmit and receive data via the network 550. In one embodiment, the user device 510 is a conventional computer system executing, for example, a Microsoft Windows compatible operating system (OS), Apple OS X, and/or a Linux distribution. In another embodiment, the user device 510 can be a device having computer functionality, such as a smart-phone, a tablet, a personal digital assistant (PDA), a mobile telephone, etc. The user device 510 is configured to communicate via the network 550. The user device 510 can execute an application, for example, a browser application that allows a user of the user device 510 to interact with the social networking system 530. In another embodiment, the user device 510 interacts with the social networking system 530 through an application programming interface (API) provided by the native operating system of the user device 510, such as iOS and ANDROID. The user device 510 is configured to communicate with the external system 520 and the social networking system 530 via the network 550, which may comprise any combination of local area and/or wide area networks, using wired and/or wireless communication systems.

In one embodiment, the network 550 uses standard communications technologies and protocols. Thus, the network 550 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 550 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 550 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 510 may display content from the external system 520 and/or from the social networking system 530 by processing a markup language document 514 received from the external system 520 and from the social networking system 530 using a browser application 512. The markup language document 514 identifies content and one or more instructions describing formatting or presentation of the content. By executing the instructions included in the markup language document 514, the browser application 512 displays the identified content using the format or presentation described by the markup language document 514. For example, the markup language document 514 includes instructions for generating and displaying a web page having multiple frames that include text and/or image data retrieved from the external system 520 and the social networking system 530. In various embodiments, the markup language document 514 comprises a data file including extensible markup language (XML) data, extensible hypertext markup language (XHTML) data, or other markup language data. Additionally, the markup language document 514 may include JavaScript Object Notation (JSON) data, JSON with padding (JSONP), and JavaScript data to facilitate data-interchange between the external system 520 and the user device 510. The browser application 512 on the user device 510 may use a JavaScript compiler to decode the markup language document 514.

The markup language document 514 may also include, or link to, applications or application frameworks such as FLASH™ or Unity™ applications, the SilverLight™ application framework, etc.

In one embodiment, the user device 510 also includes one or more cookies 516 including data indicating whether a user of the user device 510 is logged into the social networking system 530, which may enable modification of the data communicated from the social networking system 530 to the user device 510.

The external system 520 includes one or more web servers that include one or more web pages 522a, 522b, which are communicated to the user device 510 using the network 550. The external system 520 is separate from the social networking system 530. For example, the external system 520 is associated with a first domain, while the social networking system 530 is associated with a separate social networking domain. Web pages 522a, 522b, included in the external system 520, comprise markup language documents 514 identifying content and including instructions specifying formatting or presentation of the identified content.

The social networking system 530 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 530 may be administered, managed, or controlled by an operator. The operator of the social networking system 530 may be a human being, an automated application, or a series of applications for managing content, regulating policies, and collecting usage metrics within the social networking system 530. Any type of operator may be used.

Users may join the social networking system 530 and then add connections to any number of other users of the social networking system 530 to whom they desire to be connected. As used herein, the term "friend" refers to any other user of the social networking system 530 to whom a user has formed a connection, association, or relationship via the social networking system 530. For example, in an embodiment, if users in the social networking system 530 are represented as nodes in the social graph, the term "friend" can refer to an edge formed between and directly connecting two user nodes.

Connections may be added explicitly by a user or may be automatically created by the social networking system 530 based on common characteristics of the users (e.g., users who are alumni of the same educational institution). For example, a first user specifically selects a particular other user to be a friend. Connections in the social networking system 530 are usually in both directions, but need not be, so the terms "user" and "friend" depend on the frame of reference. Connections between users of the social networking system 530 are usually bilateral ("two-way"), or "mutual," but connections may also be unilateral, or "one-way." For example, if Bob and Joe are both users of the social networking system 530 and connected to each other, Bob and Joe are each other's connections. If, on the other hand, Bob wishes to connect to Joe to view data communicated to the social networking system 530 by Joe, but Joe does not wish to form a mutual connection, a unilateral connection may be established. The connection between users may be a direct connection; however, some embodiments of the social networking system 530 allow the connection to be indirect via one or more levels of connections or degrees of separation.

In addition to establishing and maintaining connections between users and allowing interactions between users, the social networking system 530 provides users with the ability to take actions on various types of items supported by the social networking system 530. These items may include groups or networks (i.e., social networks of people, entities, and concepts) to which users of the social networking system 530 may belong, events or calendar entries in which a user might be interested, computer-based applications that a user may use via the social networking system 530, transactions that allow users to buy or sell items via services provided by or through the social networking system 530, and interactions with advertisements that a user may perform on or off the social networking system 530. These are just a few examples of the items upon which a user may act on the social networking system 530, and many others are possible. A user may interact with anything that is capable of being represented in the social networking system 530 or in the external system 520, separate from the social networking system 530, or coupled to the social networking system 530 via the network 550.

The social networking system 530 is also capable of linking a variety of entities. For example, the social networking system 530 enables users to interact with each other as well as external systems 520 or other entities through an API, a web service, or other communication channels. The social networking system 530 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 530. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 530 modifies edges connecting the various nodes to reflect the relationships and interactions.

The social networking system 530 also includes user-generated content, which enhances a user's interactions with the social networking system 530. User-generated content may include anything a user can add, upload, send, or "post" to the social networking system 530. For example, a user communicates posts to the social networking system 530 from a user device 510. Posts may include data such as status updates or other textual data, location information, images such as photos, videos, links, music or other similar data and/or media. Content may also be added to the social networking system 530 by a third party. Content "items" are represented as objects in the social networking system 530. In this way, users of the social networking system 530 are encouraged to communicate with each other by posting text and content items of various types of media through various communication channels. Such communication increases the interaction of users with each other and increases the frequency with which users interact with the social networking system 530.

The social networking system 530 includes a web server 532, an API request server 534, a user profile store 536, a connection store 538, an action logger 540, an activity log 542, an authorization server 544, and a context based image compression module 546. In an embodiment of the invention, the social networking system 530 may include additional, fewer, or different components for various applications. Other components, such as network interfaces, security mechanisms, load balancers, failover servers, management and network operations consoles, and the like are not shown so as to not obscure the details of the system.

The user profile store 536 maintains information about user accounts, including biographic, demographic, and other types of descriptive information, such as work experience, educational history, hobbies or preferences, location, and the like that has been declared by users or inferred by the social networking system 530. This information is stored in the user profile store 536 such that each user is uniquely identified. The social networking system 530 also stores data describing one or more connections between different users in the connection store 538. The connection information may indicate users who have similar or common work experience, group memberships, hobbies, or educational history. Additionally, the social networking system 530 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 530, such as non-person entities, buckets, cluster centers, images, interests, pages, external systems, concepts, and the like are also stored in the connection store 538.

The social networking system 530 maintains data about objects with which a user may interact. To maintain this data, the user profile store 536 and the connection store 538 store instances of the corresponding type of objects maintained by the social networking system 530. Each object type has information fields that are suitable for storing information appropriate to the type of object. For example, the user profile store 536 contains data structures with fields suitable for describing a user's account and information related to a user's account. When a new object of a particular type is created, the social networking system 530 initializes a new data structure of the corresponding type, assigns a unique object identifier to it, and begins to add data to the object as needed. This might occur, for example, when a user becomes a user of the social networking system 530, the social networking system 530 generates a new instance of a user profile in the user profile store 536, assigns a unique identifier to the user account, and begins to populate the fields of the user account with information provided by the user.

The connection store 538 includes data structures suitable for describing a user's connections to other users, connections to external systems 520 or connections to other entities. The connection store 538 may also associate a connection type with a user's connections, which may be used in conjunction with the user's privacy setting to regulate access to information about the user. In an embodiment of the invention, the user profile store 536 and the connection store 538 may be implemented as a federated database.

Data stored in the connection store 538, the user profile store 536, and the activity log 542 enables the social networking system 530 to generate the social graph that uses nodes to identify various objects and edges connecting nodes to identify relationships between different objects. For example, if a first user establishes a connection with a second user in the social networking system 530, user accounts of the first user and the second user from the user profile store 536 may act as nodes in the social graph. The connection between the first user and the second user stored by the connection store 538 is an edge between the nodes associated with the first user and the second user. Continuing this example, the second user may then send the first user a message within the social networking system 530. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 530 (or, alternatively, in an image maintained by another system outside of the social networking system 530). The image may itself be represented as a node in the social networking system 530. This tagging action may create edges between the first user and the second user as well as create an edge between each of the users and the image, which is also a node in the social graph. In yet another example, if a user confirms attending an event, the user and the event are nodes obtained from the user profile store 536, where the attendance of the event is an edge between the nodes that may be retrieved from the activity log 542. By generating and maintaining the social graph, the social networking system 530 includes data describing many different types of objects and the interactions and connections among those objects, providing a rich source of socially relevant information.

The web server 532 links the social networking system 530 to one or more user devices 510 and/or one or more external systems 520 via the network 550. The web server 532 serves web pages, as well as other web-related content, such as Java, JavaScript, Flash, XML, and so forth. The web server 532 may include a mail server or other messaging functionality for receiving and routing messages between the social networking system 530 and one or more user devices 510. The messages can be instant messages, queued messages (e.g., email), text and SMS messages, or any other suitable messaging format.

The API request server 534 allows one or more external systems 520 and user devices 510 to call access information from the social networking system 530 by calling one or more API functions. The API request server 534 may also allow external systems 520 to send information to the social networking system 530 by calling APIs. The external system 520, in one embodiment, sends an API request to the social networking system 530 via the network 550, and the API request server 534 receives the API request. The API request server 534 processes the request by calling an API associated with the API request to generate an appropriate response, which the API request server 534 communicates to the external system 520 via the network 550. For example, responsive to an API request, the API request server 534 collects data associated with a user, such as the user's connections that have logged into the external system 520, and communicates the collected data to the external system 520. In another embodiment, the user device 510 communicates with the social networking system 530 via APIs in the same manner as external systems 520.

The action logger 540 is capable of receiving communications from the web server 532 about user actions on and/or off the social networking system 530. The action logger 540 populates the activity log 542 with information about user actions, enabling the social networking system 530 to discover various actions taken by its users within the social networking system 530 and outside of the social networking system 530. Any action that a particular user takes with respect to another node on the social networking system 530 may be associated with each user's account, through information maintained in the activity log 542 or in a similar database or other data repository. Examples of actions taken by a user within the social networking system 530 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 530, the action is recorded in the activity log 542. In one embodiment, the social networking system 530 maintains the activity log 542 as a database of entries. When an action is taken within the social networking system 530, an entry for the action is added to the activity log 542. The activity log 542 may be referred to as an action log.

Additionally, user actions may be associated with concepts and actions that occur within an entity outside of the social networking system 530, such as an external system 520 that is separate from the social networking system 530. For example, the action logger 540 may receive data describing a user's interaction with an external system 520 from the web server 532. In this example, the external system 520 reports a user's interaction according to structured actions and objects in the social graph.

Other examples of actions where a user interacts with an external system 520 include a user expressing an interest in an external system 520 or another entity, a user posting a comment to the social networking system 530 that discusses an external system 520 or a web page 522a within the external system 520, a user posting to the social networking system 530 a Uniform Resource Locator (URL) or other identifier associated with an external system 520, a user attending an event associated with an external system 520, or any other action by a user that is related to an external system 520. Thus, the activity log 542 may include actions describing interactions between a user of the social networking system 530 and an external system 520 that is separate from the social networking system 530.

The authorization server 544 enforces one or more privacy settings of the users of the social networking system 530. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 520, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 520. One embodiment allows the specification of the set of entities to comprise an enumeration of entities. For example, the user may provide a list of external systems 520 that are allowed to access certain information. Another embodiment allows the specification to comprise a set of entities along with exceptions that are not allowed to access the information. For example, a user may allow all external systems 520 to access the user's work information, but specify a list of external systems 520 that are not allowed to access the work information. Certain embodiments call the list of exceptions that are not allowed to access certain information a "block list". External systems 520 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 544 contains logic to determine if certain information associated with a user can be accessed by a user's friends, external systems 520, and/or other applications and entities. The external system 520 may need authorization from the authorization server 544 to access the user's more private and sensitive information, such as the user's work phone number. Based on the user's privacy settings, the authorization server 544 determines if another user, the external system 520, an application, or another entity is allowed to access information associated with the user, including information about actions taken by the user.

According to an embodiment of the invention, the social networking system 530 may include the context based image compression module 546. In an embodiment, the context based image compression module 546 may be implemented as the context based image compression module 106. The context based image compression module 546 may, for example, provide image compression at various image qualities based on one or more contexts of images required by a client application. The one or more contexts of each image may be identified and used to determine an image quality for compressing the image at a required size. Some contexts may suggest a need for a high image quality to be used, such as images determined to be of interest to the user. Other contexts may suggest that a high image quality may not be necessary and that a lower image quality may be sufficiently adequate. By compressing the image at the lower image quality, less data may be required to represent the image. The compressed images may be transmitted to the client device.

Hardware Implementation

Figure 6:
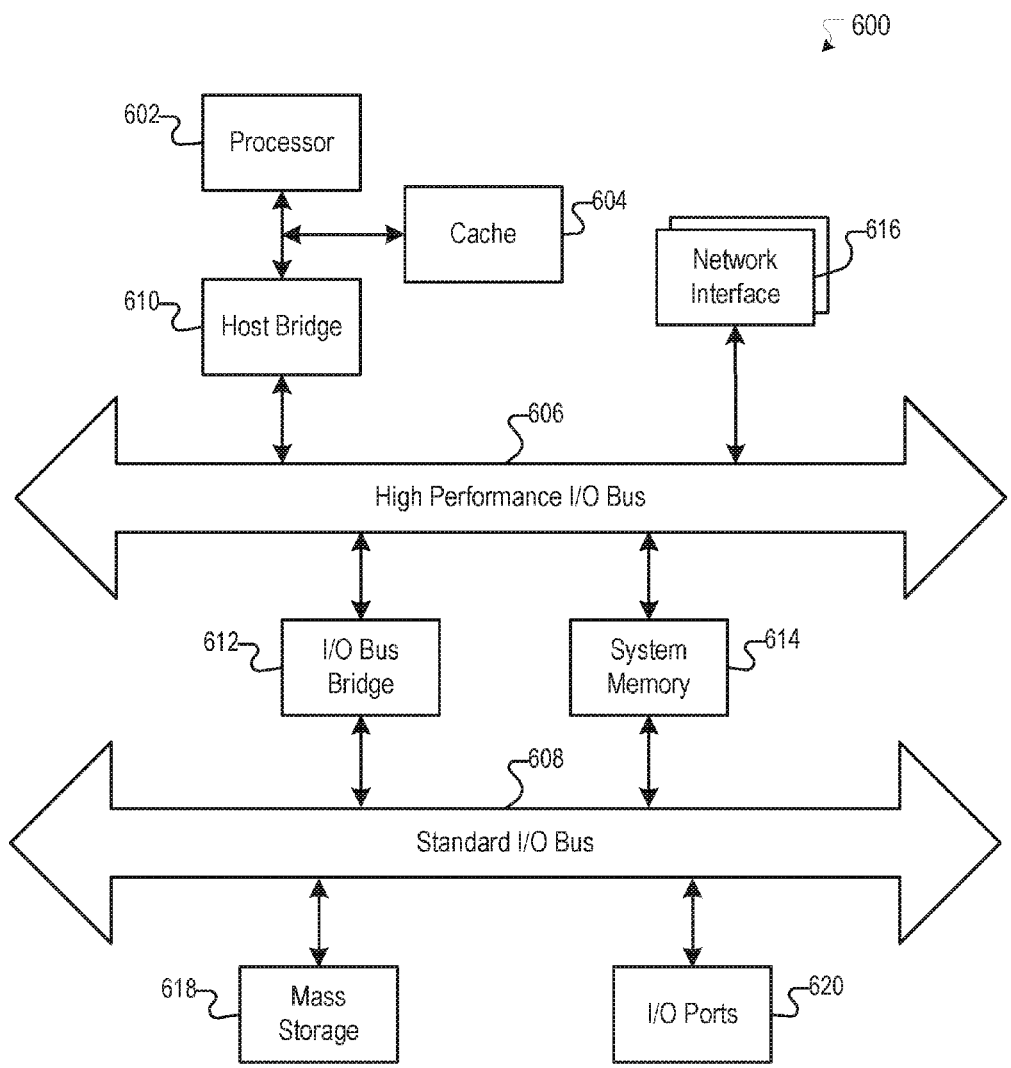
FIG. 6 illustrates an example of a computer system that may be used to implement one or more of the embodiments described herein, according to an embodiment.

The foregoing processes and features can be implemented by a wide variety of machine and computer system architectures and in a wide variety of network and computing environments. FIG. 6 illustrates an example of a computer system 600 that may be used to implement one or more of the embodiments described herein in accordance with an embodiment of the invention. The computer system 600 includes sets of instructions for causing the computer system 600 to perform the processes and features discussed herein. The computer system 600 may be connected (e.g., networked) to other machines. In a networked deployment, the computer system 600 may operate in the capacity of a server machine or a client machine in a client-server network environment, or as a peer machine in a peer-to-peer (or distributed) network environment. In an embodiment of the invention, the computer system 600 may be the social networking system 530, the user device 510, and the external system 520, or a component thereof. In an embodiment of the invention, the computer system 600 may be one server among many that constitutes all or part of the social networking system 530.

The computer system 600 includes a processor 602, a cache 604, and one or more executable modules and drivers, stored on a computer-readable medium, directed to the processes and features described herein. Additionally, the computer system 600 includes a high performance input/output (I/O) bus 606 and a standard I/O bus 608. A host bridge 610 couples processor 602 to high performance I/O bus 606, whereas I/O bus bridge 612 couples the two buses 606 and 608 to each other. A system memory 614 and one or more network interfaces 616 couple to high performance I/O bus 606. The computer system 600 may further include video memory and a display device coupled to the video memory (not shown). Mass storage 618 and I/O ports 620 couple to the standard I/O bus 608. The computer system 600 may optionally include a keyboard and pointing device, a display device, or other input/output devices (not shown) coupled to the standard I/O bus 608. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 600, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 600 are described in greater detail below. In particular, the network interface 616 provides communication between the computer system 600 and any of a wide range of networks, such as an Ethernet (e.g., IEEE 802.3) network, a backplane, etc. The mass storage 618 provides permanent storage for the data and programming instructions to perform the above-described processes and features implemented by the respective computing systems identified above, whereas the system memory 614 (e.g., DRAM) provides temporary storage for the data and programming instructions when executed by the processor 602. The I/O ports 620 may be one or more serial and/or parallel communication ports that provide communication between additional peripheral devices, which may be coupled to the computer system 600.

The computer system 600 may include a variety of system architectures, and various components of the computer system 600 may be rearranged. For example, the cache 604 may be on-chip with processor 602. Alternatively, the cache 604 and the processor 602 may be packed together as a "processor module", with processor 602 being referred to as the "processor core". Furthermore, certain embodiments of the invention may neither require nor include all of the above components. For example, peripheral devices coupled to the standard I/O bus 608 may couple to the high performance I/O bus 606. In addition, in some embodiments, only a single bus may exist, with the components of the computer system 600 being coupled to the single bus. Furthermore, the computer system 600 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 600 that, when read and executed by one or more processors, cause the computer system 600 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 600, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 602. Initially, the series of instructions may be stored on a storage device, such as the mass storage 618. However, the series of instructions can be stored on any suitable computer readable storage medium. Furthermore, the series of instructions need not be stored locally, and could be received from a remote storage device, such as a server on a network, via the network interface 616. The instructions are copied from the storage device, such as the mass storage 618, into the system memory 614 and then accessed and executed by the processor 602. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 600 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to one embodiment", an embodiment", "other embodiments", one series of embodiments", some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed:

1. A computer implemented method comprising:
   identifying, by a computing system, an image to be displayed through a client device;
   identifying, by the computing system, one or more contexts of the image, wherein at least one of the contexts describe a page in which the image is included based at least in part on a position of the image on the page and a number of images on the page or in a section on the page;
   determining, by the computing system, an image quality for the image based at least in part on the one or more contexts that describe the page in which the image is included; and
   compressing, by the computing system, the image at the image quality.

2. The computer implemented method of claim 1, wherein determining an image quality for the image based on the one or more contexts of the image further comprises:
   determining, by the computing system, the image quality for the image based at least in part on the image being a preview image for a content item.

3. The computer implemented method of claim 2, wherein the content item is included in a news feed section of the page.

4. The computer implemented method of claim 1, the method further comprising:
   determining, by the computing system, a ranking for a content item for which the image is a preview image; and
   determining, by the computing system, the image quality for the image based at least in part on the ranking.

5. The computer implemented method of claim 1, wherein determining an image quality for the image based on the one or more contexts of the image further comprises:
   determining, by the computing system, the image quality for the image based at least in part on the image being included in a virtual photo album.

6. The computer implemented method of claim 1, wherein determining an image quality for the image based on the one or more contexts of the image further comprises:
   determining, by the computing system, the image quality for the image based at least in part on the image being included in an interstitial page.

7. The computer implemented method of claim 6, wherein the interstitial page is an advertisement page.

8. The computer implemented method of claim 6, wherein the interstitial page is a login page.

9. The computer implemented method of claim 1, wherein determining an image quality for the image based on the one or more contexts of the image further comprises:
   determining, by the computing system, that the image is included in a content item that is determined to be of interest to a user operating the client device; and
   determining, by the computing system, the image quality for the image based at least in part on the content item being of interest to the user.

10. The computer implemented method of claim 1, wherein the image quality corresponds to one of a plurality of pre-defined image qualities.

11. A system comprising:
   at least one processor; and
   a memory storing instructions configured to instruct the at least one processor to perform:
      identifying an image to be displayed through a client device;
      identifying one or more contexts of the image, wherein at least one of the contexts describe a page in which the image is included based at least in part on a position of the image on the page and a number of images on the page or in a section on the page;
      determining an image quality for the image based at least in part on the one or more contexts that describe the page in which the image is included; and
      compressing the image at the image quality.

12. The system of claim 11, wherein determining an image quality for the image based on the one or more contexts of the image further causes the system to perform:
   determining the image quality for the image based at least in part on the image being a preview image for a content item.

13. The system of claim 12, wherein the content item is included in a news feed section of a page.

14. The system of claim 11, wherein the instructions further cause the system to perform:
   determining a ranking for a content item for which the image is a preview image; and
   determining the image quality for the image based at least in part on the ranking.

15. The system of claim 11, wherein determining an image quality for the image based on the one or more contexts of the image further causes the system to perform:
   determining the image quality for the image based at least in part on the image being included in a virtual photo album.

16. A non-transitory computer storage medium storing computer-executable instructions that, when executed, cause a computer system to perform a computer-implemented method comprising:
   identifying an image to be displayed through a client device;
   identifying one or more contexts of the image, wherein at least one of the contexts describe a page in which the image is included based at least in part on a position of the image on the page and a number of images on the page or in a section on the page;
   determining an image quality for the image based at least in part on the one or more contexts that describe the page in which the image is included; and
   compressing the image at the image quality.

17. The non-transitory computer storage medium of claim 16, wherein determining an image quality for the image based on the one or more contexts of the image further causes the computer system to perform:
   determining the image quality for the image based at least in part on the image being a preview image for a content item.

18. The non-transitory computer storage medium of claim 17, wherein the content item is included in a news feed section of a page.

19. The non-transitory computer storage medium of claim 16, wherein the instructions further cause the computer system to perform:
   determining a ranking for a content item for which the image is a preview image; and
   determining the image quality for the image based at least in part on the ranking.

20. The non-transitory computer storage medium of claim 16, wherein determining an image quality for the image based on the one or more contexts of the image further causes the computer system to perform:
   determining the image quality for the image based at least in part on the image being included in a virtual photo album.

* * * * *